United States Patent [19]

McCluskey

[11] 4,128,601

[45] Dec. 5, 1978

[54] THICKENING AGENTS FOR LOW PRESSURE MOLDING COMPOSITIONS

[75] Inventor: John J. McCluskey, Granville, Ohio

[73] Assignee: Owens-Corning Fiberglas Corporation, Toledo, Ohio

[21] Appl. No.: 772,781

[22] Filed: Feb. 28, 1977

[51] Int. Cl.² .............................................. C08L 67/06
[52] U.S. Cl. ................................ 260/862; 260/40 R; 260/863
[58] Field of Search ....................... 260/862, 863, 40 R

[56] References Cited

U.S. PATENT DOCUMENTS

| | | | |
|---|---|---|---|
| 3,631,217 | 12/1971 | Rabenold | 260/863 |
| 3,740,372 | 6/1973 | Baum et al. | 260/863 |
| 3,789,030 | 1/1974 | Volgstadt et al. | 260/29.6 NR |
| 3,810,863 | 5/1974 | Halton, Jr. et al. | 260/863 |
| 3,992,479 | 11/1976 | Roberts | 260/40 R |
| 4,026,965 | 5/1977 | Roberts | 260/40 R |

*Primary Examiner*—Eugene C. Rzucidlo
*Attorney, Agent, or Firm*—Ronald C. Hudgens; Philip R. Cloutier; Dennis M. Kozak

[57] ABSTRACT

Low pressure molding compositions comprising a thermosetting resin and a thermoplastic resin are thickened with a combination thickening agent within a specific concentration range to retard rapid initial thickening of the molding compositions.

7 Claims, 1 Drawing Figure

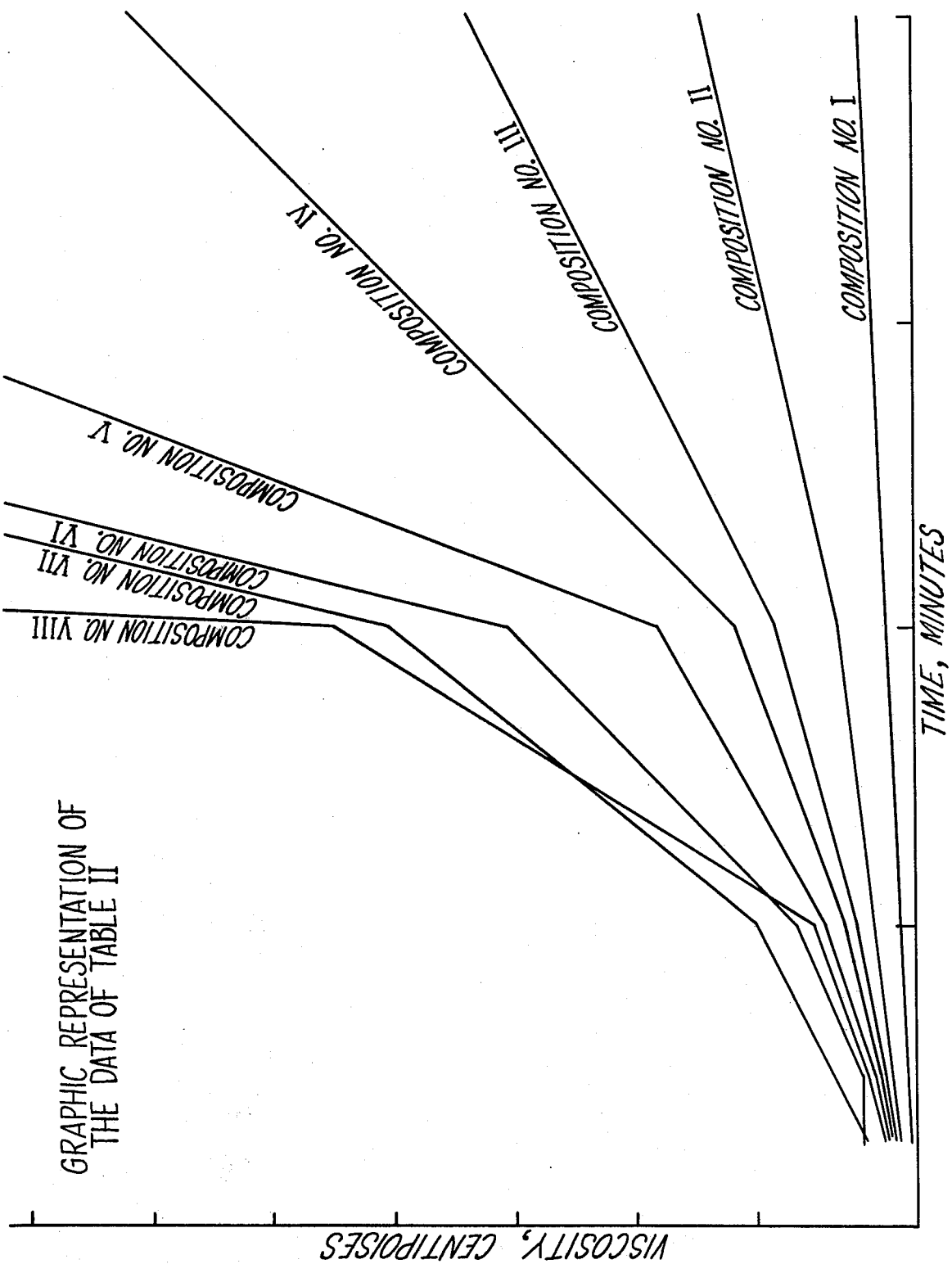

THICKENING AGENTS FOR LOW PRESSURE MOLDING COMPOSITIONS

This invention relates to moldable compositions.

More specifically, this invention relates to thickening agents for low pressure molding compositions.

In one of its more specific aspects, this invention facilitates the production of sheet and bulk molding compounds by providing compositions moldable at low pressures which compositions comprise at least one alkaline-earth metal hydroxide and zinc oxide as a combination thickening agent.

The production and use of sheet and bulk molding compounds are well known. Such molding compounds are based upon unsaturated polyester resin systems and are widely used in the production of automobile body parts. Usually such systems are based upon a combination of an unsaturated polyester resin contained in an monomer and a thermoplastic soluble in the monomer. These materials are blended with thickening agents, crosslinking catalysts, release agents and, optionally, colorants, inhibitors and the like.

This resulting molding composition in the form of a paste can then be processed through equipment to produce sheet or bulk molding compounds. For example, sheet molding compound can be produced by laying down a first layer of the paste on a first layer of polyethylene film or the equivalent thereof, laying on this first layer of the paste filler reinforcements such as chopped glass fibers in an amount up to about 30 percent by weight of the total weight of the paste, and laying thereover a second layer of the paste. The two layers of the paste with the filler reinforcements sandwiched therebetween are then topped with a second sheet of polyethylene film and the resulting composite (sheet molding compound) is stored.

As used herein, the term "working time" will be understood to mean that period during which the molding composition remain in that viscosity range within which the molding composition will satisfactorily wet-out and impregnate reinforcing material, in particular, glass fibers.

The prior art teaches molding compounds which are suitable for molding at low pressures. Ideally, and in this respect the prior art low pressure molding compounds are deficient, the working time should provide flexibility to compensate for minor process interruptions which frequently occur in the processing of the molding compositions. Accordingly, time is required in excess of the amount of time needed to wet-out and impregnate reinforcements, so that if a minor process interruption occurs, the interruption can be corrected and processing of the molding composition continued. Otherwise, a minor process interruption requires the scraping of the molding composition.

The present invention provides a combination thickening agent which, when employed in low pressure molding compositions, reduces initial thickening rates and extends working time.

According to this invention, there is provided a thickening agent consisting essentially of at least one alkaline-earth metal hydroxide and zinc oxide.

Also according to this invention, there is provided a low pressure molding composition comprising an unsaturated, crosslinkable polyester, a monomer, a thermoplastic soluble in the monomer and a thickening agent consisting essentially of at least one alkaline-earth metal hydroxide and zinc oxide, the thickening agent being present in an effective amount to retard the rate of thickening of the molding composition as compared to the rate at which the molding composition thickens in the absence of the thickening agent or in the presence of other thickening agents, such as, calcium hydroxide.

This invention also provides a method for retarding the rate of thickening of low pressure molding compositions which method comprises the incorporation of a thickening agent consisting essentially of at least one alkaline earth metal hydroxide and zinc oxide into a low pressure molding composition.

This invention also provides a molding compound comprising a low pressure molding composition comprising an unsaturated, crosslinkable polyester, a monomer, a thermoplastic soluble in the monomer and a thickening agent consisting essentially of at least one alkaline-earth metal hydroxide and zinc oxide, the thickening agent being present in an amount sufficient to retard the rate of thickening of the molding composition as compared to the rate at which the molding composition thickens in the absence of the thickening agent or in the presence of other thickening agents, such as, calcium hydroxide.

As used herein, molding compositions viscosities unless otherwise stated, refer to Brookfield viscosities, Model HBT with Helipath stand and T-A spindle at 5 rpm and 90° F., this method and its values being familiar to those skilled in the art.

The moldable compositions of this invention, will be comprised, preferably, of the following components:

(a) an unsaturated, crosslinkable polyester resin in an amount within the range of from about 55 to about 80 parts by weight per 100 parts by weight of resin. The polyester resin will be employed in the form of a monomer-containing syrup having a solids or resin content of approximately 67 percent by weight. The polyester resin will have an acid number, or value, within the range of from about 15 to about 45, and preferably about 30. It will have a molecular weight within the range of from about 1,300 to about 2,500. (As used herein, "molecular weight" refers to weight average molecular weight);

(b) a thermoplastic resin having an acid number up to about 3.5, the thermoplastic being present in the composition in an amount within the range of from about 20 to about 45 parts by weight per 100 parts by weight of resin. The thermoplastic resin will be employed in the form of a monomer-containing syrup having a solids content of approximately 33 percent. The thermoplastic syrup will have a preferred acid number of about 3.0. The thermoplastic will have a molecular weight within the range of from about 80,000 to about 350,000, preferably within the range of from about 100,000 to 250,000 with a molecular weight of about 160,000 being preferred;

(c) a monomer in which the acid-functional thermoplastic is soluble;

(d) a mold release agent, or internal lubricant, in an amount of from about 0.5 to about 5 parts by weight per 100 parts by weight of the resin;

(e) one or more fillers in an amount within the range of from about 25 to about 180 parts by weight per 100 parts by weight of the resin;

(f) chopped glass fibers in an amount within the range of from about 20 to about 150 parts by weight per 100 parts by weight of the resin;

(g) a crosslinking catalyst in an amount within the range of from about 0.1 to about 3 parts by weight per 100 parts by weight of the resin; and, (h) a thickening agent consisting essentially of at least one alkaline-earth metal hydroxide and zinc oxide in an amount within the range of from about 1 to about 3.5 parts by weight per 100 parts by weight of the resin.

In the preferred embodiment of this invention, the zinc oxide will be present in an amount within the range of from about 1 to about 6 parts per part by weight of alkaline-earth metal hydroxide.

The unsaturated polyesters which can be employed in this invention are the poly condensation-products of at least one a, b, - ethylenically unsaturated dicarboxylic acid (which term as used herein includes the corresponding anhydrides) and dihydric alcohols or oxides.

Suitable unsaturated dicarboxylic acids include maleic anhydride, fumaric acid, itaconic acid, citraconic acid and chloromaleic acid and the like, and mixtures thereof. Preferred materials are maleic anhydride and fumaric acid. A minor proportion of the unsaturated dicarboxylic acid, that is, up to about 25 mole percent, can be replaced by saturated carboxylic acids such as ortho-phthalic acid, succinic acid, adipic acid, sebacic acid, methyl-succinic acid and the like, and their mixtures.

Suitable dihydric glycols and oxides which can be employed include 1,2-propaneldiol, dipropylene glycol, ethylene glycol, propylene glycol, diethylene glycol, 1,3-butanediol, 1,4-butanediol, neopentyl glycol, triethylene glycol, tripropylene glycol, ethylene oxide and the like, and mixtures thereof.

The unsaturated polyester will be soluble in the after-defined monomers in which it will be crosslinkable during the molding process to a thermoset, continuous phase in which the thermoplastic will exist as the disperse phase.

The thermoplastic is a polymer or copolymer or mixture thereof which is prepared employing a free-radical initiator and at least one ethylenically unsaturated monomer. Suitable monomers include alkyl methacrylates and alkyl acrylates in which the alkyl group contains up to about 18 carbon atoms, including alkyl groups chosen from methyl, ethyl, n-propyl, iso-propyl, n-butyl, isobutyl, 2-ethyhexyl, stearyl and the like, and mixtures thereof. Also suitable are cyclic methacrylates and acrylates wherein the cyclic group is chosen from cyclohexyl, benzyl, bicyclic groups such as isobornyl, bornyl, fenchyl, isofenchyl, and the like. Particularly suitable are monovinyl aromatic compounds such as styrene, substituted styrenes such as a-methyl styrene, vinyl toluene, tert-butylstyrene, halogen substituted styrenes such as chlorostyrene, dichlorostyrene and the like, and mixtures thereof. Also employable are acrylonitrile, methacrylonitrile, and mixtures of vinyl chloride and vinyl acetate. Cellulose acetate butyrate and cellulose acetate propioniate can also be used.

Preferred thermoplastics are formed from about 80 to about 99.9 weight percent styrene copolymerized with acrylic acid and, or, methacrylic acid in an amount within the range of from about 0.05 to about 1.9 weight percent; or with acrylonitrile in an amount within the range of from about 1.3 to about 20 weight percent; or with hydroxyethyl acrylate in an amount within the range of from about 1.3 to about 20 weight percent. Suitable thermoplastic compositions also include graft polymers of styrene and polybutadiene, styrene and styrene-butadiene polymers and the like containing from about 70 to about 97 weight percent styrene and from about 3 to about 30 weight percent of the elastomeric group.

As mentioned, the thermoplastic will have an acid number of up to about 3.5, the acid functionality being incorporated in the thermoplastic employing suitable carboxylic or other acid-functional substituents such as acrylic acid, methacrylic acid and the like. The preferred thermoplastic comprises the reaction product of about 100 parts by weight of styrene and about 0.05 parts by weight acrylic acid, the acid functionality being incorporated in the thermoplastic as a component of the monomer system used to prepare the polymer.

The monomer will be one in which the thermoplastic is soluble and which is copolymerizable with the unsaturated polyester to produce a crosslinked, thermoset matrix. The monomer is a liquid monomer, or mixture of monomers, having at least one polymerizable reactive, ethylenically unsaturated ($-C\!=\!C<$) group per molecule. The monomer system can be chosen from the group consisting of styrene, substituted styrenes such as vinyl toluene, tert-butyl styrene, lower (i.e. $C_2$ to $C_4$) alkyl esters of acrylic and methacrylic acids, a-methyl styrene, cyclic acrylates, methacrylates such as cyclohexyl methacrylate and acrylate, benzyl methacrylate and acrylate and the like, bicyclic methacrylates and acrylates such as isobornyl methacrylate and acrylate, halogenated styrenes such as chlorostyrene, dichlorostyrene, 1,3-butanediol dimethacrylate, diallyl phthalate and the like, and mixtures thereof.

The mold release agents which can be used in this invention are those well known in the art and include stearates of zinc, calcium, aluminum and the like.

Various types and concentrations of fillers can be employed in the present invention, these including clay, talc, mica, alumina trihydrate, calcium carbonate, silicas, carbon black, glass fibers and the like. In the composition of the present invention, calcium carbonate and chopped glass fibers are employed in the preferred embodiment.

The crosslinking catalysts will be such as are conventionally employed. These comprise free radical catalysts which do not degrade until molding temperatures are attained but which provide fast cure after gelation. Among the catalysts which can be employed are benzoyl peroxide, tert-butyl perbenzoate, tert-butyl peroxide, tert-butyl peroctoate, lauryl peroxide, and the like.

The thickening agent employed in this invention will consist essentially of one or more alkaline-earth metal hydroxides in combination with zinc oxide. Particularly suitable alkaline-earth metal hydroxides are calcium hydroxide, barium hydroxide, magnesium hydroxide and strontium hydroxide.

The following examples illustrate the invention but are not to be considered as limiting the invention to the specific materials inasmuch as the invention is employable with all resins normally used to produce molding compounds.

EXAMPLE I

A thermosetting polyester resin syrup was prepared from the following material in substantially the following manner.

| Materials | Pounds |
| --- | --- |
| Propylene Glycol | 428.6 |
| Isophthalic Acid 85* | 131.5 |

-continued

| Materials | Pounds |
|---|---|
| Maleic Anhydride | 439.8 |
| Toluhydroquinone (Solid) | 0.33 |

*(Isophthalic Acid 85 – 85% Isophthalic Acid, 15% Terephthalic acid)

The polyester resin syrup was prepared by charging all of the propylene glycol and all of the Isophthalic Acid 85 into the reactor while using a continuous nitrogen sparge. The temperature of the contents of the reactor was raised to 200° F., agitation started and the nitrogen sparge continued overnight. Next, all of the maleic anhydride was added to the reactor contents and the temperature of the contents was raised to 420° F. and about 6 hours after the first distillate, when the reactor contents had reached an acid value of about 40, about 0.09 pound of solid toluhydroquinone was added. The reactor contents were heated for about 2 hours, the contents reached an acid value of about 32 and the contents of the reactor were then cooled to 350° F.

In another reactor, 428.6 pounds of styrene and 0.24 pound of solid toluhydroquinone were mixed and heated to a temperature of 135° F. Thereafter, 890.7 pounds of polyester resin, produced as described above and at a temperature of about 200° F. were added to the styrene-toluhydroquinone mixture to produce a thinned polyester syrup which had a viscosity (LVT, #4, 60 rpm, 77° F.) in the range of 2,000–2,500 cps, a maximum water content of about 0.08 weight percent, an acid value of from about 18–22 and a monomer content within the range of about 32–35 weight percent.

EXAMPLE II

This example illustrates the preparation of a thermoplastic resin, subsequently blended with the thermosetting resin produced in Example I, as herein described.

The materials of the thermoplastic resin and the method preparation were as follows:

| Materials | Pounds |
|---|---|
| Styrene | 7085 |
| Acrylic Acid | 34 |
| Soloprene 1205C* | 808 |
| Poly BDR-45-HT | 457 |
| Benzoyl Peroxide | 12 |
| Toluhydroquinone (Solid) | 3.2 |

*Soloprene 1205C - a 25/75 styrene-butadiene block copolymer available from Phillips Petroleum Co.
**Poly BDR-45-HT - a polybutadiene polymer available from Arco Chemical Co.

The total amounts of all the materials except the benzoyl peroxide and the toluhydroquinone were charged to the reactor. The contents of the reactor were purged with nitrogen and heated to 163° F. At 163° F., the benzoyl peroxide was added to the reactor contents. The reactor contents were cooled and at 35% solids content, the toluhydroquinone was added to the reactor contents. The contents of the reactor were recovered as a thermoplastic resin and had a viscosity (LVT, #4, 60 rpm, 77° F.) of from about 4,000–7,000, an acid value of from 2.5 to 3.5, a solids content of from about 30.5 to 33.5 and a maximum water content of 0.08 weight percent.

The thermoplastic prepared above was incorporated into a series of molding compositions with the thermosetting resin produced in Example I, the principal difference in each molding composition being in the ratio of calcium hydroxide to zinc oxide employed as the thickening agent. The molding composition formulations, eight in all, were prepared as follows, all components being expressed in parts by weight:

TABLE I

| | MOLDING COMPOSITION FORMULATIONS | | | | | | | |
|---|---|---|---|---|---|---|---|---|
| Composition No. | I (Control) | II | III | IV | V | VI | VII | VIII (Control) |
| Materials (parts by weight) | | | | | | | | |
| Resin of Example I | 60 | 60 | 60 | 60 | 60 | 60 | 60 | 60 |
| Thermoplastic of Example II | 40 | 40 | 40 | 40 | 40 | 40 | 40 | 40 |
| tert-butyl-perbenzoate | 1 | 1 | 1 | 1 | 1 | 1 | 1 | 1 |
| Zinc Stearate | 4 | 4 | 4 | 4 | 4 | 4 | 4 | 4 |
| Calcium carbonate | 150 | 150 | 150 | 150 | 150 | 150 | 150 | 150 |
| Ca(OH)$_2$ | 0.5 | .5 | .5 | .5 | .5 | .5 | .5 | 1.25 |
| ZnO | 0 | .5 | 1.0 | 1.5 | 2.0 | 2.5 | 3.0 | 0 |

Viscosity determinations were made on all compositions with the results shown in Table II.

TABLE II

| Molding Composition No. | I (Control) | II | III | IV | V | VI | VII | VIII (Control) |
|---|---|---|---|---|---|---|---|---|
| ZnO, parts by weight | 0 | 0.5 | 1.0 | 1.5 | 2.0 | 2.5 | 3.0 | 0 |
| Viscosity (in M cps) | | | | | | | | |
| Initial | 36.5 | 39 | 40 | 39 | 39.7 | 58.4 | 39 | 40 |
| After 15 minutes | 39.7 | 45.1 | 51.2 | 53.8 | 55.7 | 56.6 | 70.1 | 49.6 |
| After 30 minutes | 42.6 | 51.5 | 59.8 | 63.4 | 71.7 | 84.5 | 99.7 | 71.4 |
| After 60 minutes | 48.0 | 68.2 | 92.8 | 109.1 | 139.5 | 201.6 | 251.2 | 267.8 |
| After 120 minutes | 57.9 | 122.9 | 217.6 | 358.4 | 771.2 | 1200 | 1400 | 4200.0 |

It will be seen from the drawing, which is a graphic representation of the viscosity data of Table II, that the viscosity rise of the compositions employing a thickener which consists essentially of at least one alkaline-earth metal hydroxide and zinc oxide provide molding compositions having extended working times.

Molding Composition No. I (Control) is included to establish a base curve; Molding Composition No. I does not comprise zinc oxide and is not a composition according to this invention. Furthermore, Molding Composition No. I is not suitable to produce molding compounds since its viscosity rise is such that it would never achieve a molding viscosity.

Molding Composition No. VIII (Control) represents a low pressure molding composition according to the prior art and is included to demonstrate the rapid viscosity rise in a molding composition which does not employ a thickening agent which consists essentially of at least one alkaline-earth metal hydroxide and zinc oxide.

Molding Compositions Nos. II–VII are compositions according to the present invention and demonstrate that low pressure molding compositions which comprise a thickening agent consisting essentially of an alkaline-earth metal hydroxide and zinc oxide, employed within the range of from about one to about six parts of zinc oxide per part by weight of alkaline-earth metal hydroxide, possess extended working times.

It will be evident from the foregoing that various modifications can be made to this invention. Such, however, are considered as being within the scope of this invention.

What is claimed is:

1. A moldable composition comprising:
   (a) an unsaturated, crosslinkable polyester resin having an acid number of about 15 to about 45 and a molecular weight from about 1,300 to about 2,500;
   (b) an ethylenically unsaturated monomer;
   (c) a thermoplastic resin having an acid number up to about 3.5 and a molecular weight of about 80,000 to about 350,000 soluble in said monomer; and
   (d) a thickening agent consisting essentially of at least one alkaline-earth metal hydroxide and zinc oxide in an amount sufficient to thicken said moldable composition, the amount of said zinc oxide being sufficient to retard the rate of thickening of said molding compound as compared to the rate at which the molding compound thickens in the absence of said zinc oxide.

2. The composition of claim 1 in which said thickening agent is employed in said composition in an amount within the range of from about 1 to about 3.5 parts per one hundred parts by weight of the total amount of said polyester and said thermoplastic resins.

3. The composition of claim 1 in which said zinc oxide is employed in an amount within the range of from about 1 to about 6 parts per part by weight of said alkaline-earth metal hydroxide.

4. The composition of claim 1 in which said thickening agent consists essentially of calcium hydroxide and zinc oxide.

5. A method of producing a molded composition which comprises:
   forming a mixture of an unsaturated, crosslinkable polyester resin having an acid number of about 15 to about 45 and a molecular weight of about 1,300 to about 2,500, an ethylenically unsaturated monomer, and a thermoplastic resin having an acid number up to about 3.5 and a molecular weight of about 80,000 to about 350,000 soluble in said monomer;
   (b) aging said mixture in admixture with an amount of thickening agent sufficient to thicken said mixture, said thickening agent consisting essentially of at least one alkaline-earth metal hydroxide and zinc oxide; said zinc oxide being present in sufficient quantity to retard the rate of thickening of said mixture as compared to the rate at which the mixture thickens in the absence of said zinc oxide;
   (c) incorporating glass fiber reinforcements into the resulting mixture; and
   (d) molding said resulting mixture containing glass fiber to produce a molded composition.

6. The method of claim 5 in which said thickening agent consists essentially of calcium hydroxide and zinc oxide.

7. A method of retarding the increase in viscosity of a molding composition comprising an unsaturated, crosslinkable polyester resin having an acid number of about 15 to about 45 and a molecular weight of about 1,300 to 2,500, an ethylenically unsaturated monomer, and a thermoplastic resin having an acid number up to about 3.5 and a molecular weight of about 80,000 to about 350,000 soluble in said monomer, which comprises incorporating into said molding composition in an amount sufficient to thicken said composition a thickening agent consisting essentially of at least one alkaline-earth metal hydroxide and zinc oxide, said zinc oxide being present in sufficient quantity to retard the rate of thickening of said mixture as compared to the rate at which the mixture thickens in the absence of said zinc oxide.

* * * * *